United States Patent
Kobayashi

(10) Patent No.: US 7,841,333 B2
(45) Date of Patent: Nov. 30, 2010

(54) COOKING STOVE

(75) Inventor: Toshihiro Kobayashi, Nagoya (JP)

(73) Assignee: Paloma Industries, Limited, Nagoya-Shi (JP)

( * ) Notice: Subject to any disclaimer, the term of this patent is extended or adjusted under 35 U.S.C. 154(b) by 139 days.

(21) Appl. No.: 11/780,690

(22) Filed: Jul. 20, 2007

(65) Prior Publication Data

US 2008/0029077 A1    Feb. 7, 2008

(30) Foreign Application Priority Data

Jul. 28, 2006    (JP)    ................ 2006-206819

(51) Int. Cl.
F24C 15/10    (2006.01)
A47J 27/02    (2006.01)

(52) U.S. Cl. ................ 126/214 D; 126/390.1

(58) Field of Classification Search ........... 126/39 R, 126/39 M, 212, 214 A–214 D, 215, 376.1, 126/211, 216, 219, 390.1; A47J 27/02, 27/022, A47J 36/34, 36/36

See application file for complete search history.

(56) References Cited

U.S. PATENT DOCUMENTS

| | | | | |
|---|---|---|---|---|
| 966,579 | A | * | 8/1910 | Myers .......................... 126/400 |
| 1,614,854 | A | * | 1/1927 | Stockstrom .................. 431/234 |
| 1,808,550 | A | * | 6/1931 | Harpman .................... 126/215 |
| 1,948,699 | A | * | 2/1934 | Dalen .......................... 126/182 |
| D122,275 | S | * | 9/1940 | Reeves ......................... D7/408 |
| 2,321,169 | A | * | 6/1943 | Tullis .......................... 126/44 |
| 2,595,005 | A | * | 4/1952 | Shelton et al. ............. 126/39 R |
| 4,583,941 | A | * | 4/1986 | Elperin et al. .............. 431/347 |
| 4,627,411 | A | * | 12/1986 | Mertler ...................... 126/39 E |
| D340,383 | S | * | 10/1993 | Addison et al. .............. D7/407 |
| D353,300 | S | * | 12/1994 | Edman et al. ................ D7/408 |
| 5,800,156 | A | * | 9/1998 | Kahlke et al. ............... 431/328 |
| 5,901,695 | A | * | 5/1999 | Deptolla .................... 126/39 R |
| 6,131,561 | A | * | 10/2000 | Maxwell et al. ........... 126/39 R |
| 2007/0199558 | A1 | * | 8/2007 | Kobayashi ................ 126/39 E |

FOREIGN PATENT DOCUMENTS

| | | |
|---|---|---|
| DE | 202 014 35 U1 | 7/2002 |
| FR | 1127095 * | 5/1966 |
| GB | 481578 * | 6/1936 |
| JP | 2003-166718 A1 | 6/2003 |
| JP | 2005-291691 A1 | 10/2005 |
| JP | 2005291691 A * | 10/2005 |
| JP | 2006-010298 | 1/2006 |
| JP | 2006-071158 A1 | 3/2006 |

(Continued)

Primary Examiner—Kenneth B Rinehart
Assistant Examiner—Frances Kamps
(74) Attorney, Agent, or Firm—Burr & Brown

(57) ABSTRACT

A cooking stove in which heat exchange between combustion gas and the bottom surface of a cooking container is sufficiently conducted and heat exchange efficiency is improved is provided. On a top plate, a plate that supports a cooking container is arranged concentrically with the burner head of the burner viewed from above. This plate is disc-shaped where an opening which is larger than the burner head is defined at the center. Moreover, eight protrusions having an angular cross section where slopes become gentler as they extend toward the outer circumferential side are spirally arranged around the opening viewed from above, and these protrusions are formed by press forming.

6 Claims, 1 Drawing Sheet

FOREIGN PATENT DOCUMENTS

| | | |
|---|---|---|
| JP | 2006-138591 | 6/2006 |
| JP | 2006-138592 | 6/2006 |
| JP | 2006-138595 | 6/2006 |
| WO | WO 2006/004181 A1 | 1/2006 |
| WO | WO 2006/051631 A1 | 5/2006 |

* cited by examiner

COOKING STOVE

BACKGROUND OF THE INVENTION

This application claims the benefit of Japanese Patent Application Number 2006-206819 filed on Jul. 28, 2006, the entirety of which is incorporated by reference.

FIELD OF THE INVENTION

The present invention relates to a cooking stove in which a ring-shaped plate is disposed on a top plate of a body and around a burner, and a cooking container is supported by the ring-shaped plate for heating.

In conventional cooking stoves, as shown in a cooking stove disclosed in Japanese Patent Publication of Unexamined Application No. 2006-71158, a burner is arranged at the center position of an opening arranged in a top plate of a body, and a ring-shaped plate having radial trivet claws is disposed at the circumference of the opening. A cooking container, a pot for example, is put on the upper surface of the trivet claws and the bottom surface of the cooking container is heated by a burner.

In this cooking stove, combustion gas of the burner moves from the center of the bottom surface of the cooking container radially along the trivet claws and is discharged to the outside of the bottom surface of the cooking container. As a result, heat exchange between the combustion gas and the bottom surface of the cooking container is conducted. However, improvement of heat exchange efficiency is a significant subject for a cooking stove, so that a cooking stove capable of reducing loss of heat exchange has been expected.

To deal with this problem, an object of the present invention is to provide a cooking stove in which the heat exchange between combustion gas and the bottom surface of a cooking container is sufficiently conducted, and thus improvements of heat exchange efficiency can be made.

SUMMARY OF THE INVENTION

In order to achieve the above object, in a cooking stove according to a first aspect, a plurality of protrusions having an angular cross section are arranged on the ring-shaped plate spirally viewed from above.

Moreover, in a cooking stove according to a second aspect, in addition to the object according to the first aspect, in order to transmit combustion heat of combustion gas to a cooking container efficiently, the protrusions are formed to be asymmetrically angular where a slope on a side of the center of the ring-shaped plate is gentler than a slope on an outer side of the ring-shaped plate.

Further, in a cooking stove according to a third aspect, in addition to the object according to the first or second aspect, in order to utilize the protrusions efficiently, all the protrusions or some of the protrusions are formed at the same height so as to support the bottom surface of the cooking container.

Further, in a cooking stove according to a fourth aspect, in addition to the object according to any of the first to third aspect, in order to form the protrusions easily at a low cost, press forming is applied.

According to the cooking stove described in the first aspect, since combustion gas flowing along the protrusions is guided to the side of the bottom surface of the cooking container by an angular shape of a slope, combustion gas strikes the bottom surface of the cooking container efficiently. Consequently, a contact distance between the combustion gas and the bottom surface of the cooking container increases. Thus, heat exchange between the combustion gas and the bottom surface of the cooking container is efficiently conducted.

According to the cooking container described in the second aspect, in addition to the effect of the first aspect, at gentle slopes of the protrusions, the combustion gas flow rate is not decreased along with the decrease of the volume flow rate of the combustion gas. Thus, hot combustion heat does not diffuse, so that it is efficiently transmitted to the cooking container.

According to the cooking container described in the third aspect, in addition to the effects of the first or second aspects, an efficient configuration is achieved in which the protrusions are also used for supporting the cooking container like conventional trivet claws.

According to the cooking container described in the fourth aspect, in addition to the effects of any of the first to third aspects, the protrusions are formed by press forming, so that they are easily formed at a low cost.

DETAILED DESCRIPTION OF THE PREFERRED EMBODIMENT

Hereinafter, a preferred embodiment according to the present invention will be explained with reference to the drawings.

Figure 1:
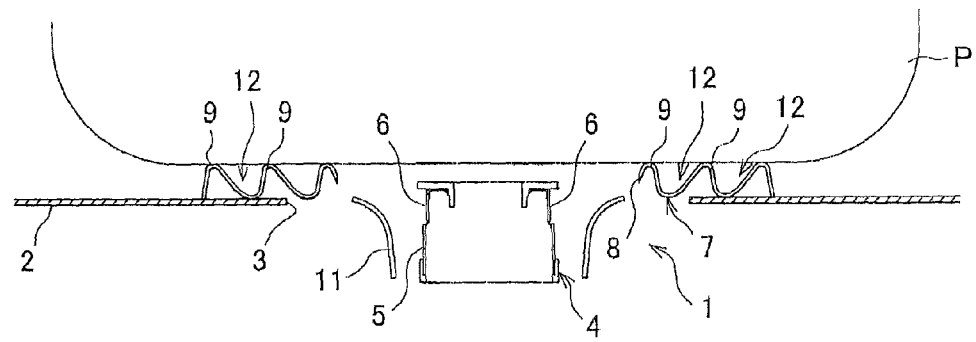
FIG. 1 is an explanatory view of a burner portion of a table burner.

FIG. 1 is an explanatory view of a burner portion of a table burner as an example of a cooking stove. In a burner portion 1, at a center portion of an opening 3 defined on a top plate 2 of a body, a cylindrical burner 4 is disposed. This burner 4 is an all first air type burner that takes in air necessary for combustion as first air by a fan (not shown). Moreover, the burner 4 has a configuration in which a cylindrical burner head 5 having many flame ports 6, 6 ... in an upper portion of the outer circumference is disposed above a not shown burner main body that mixes gas and combustion air.

Figure 2:
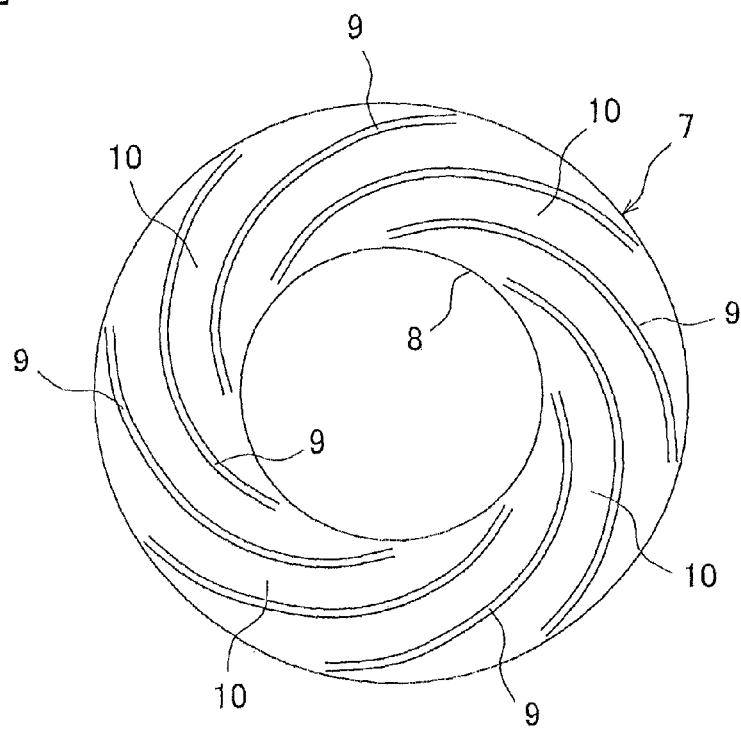
FIG. 2 is a plain view of a plate.
Figure 3:
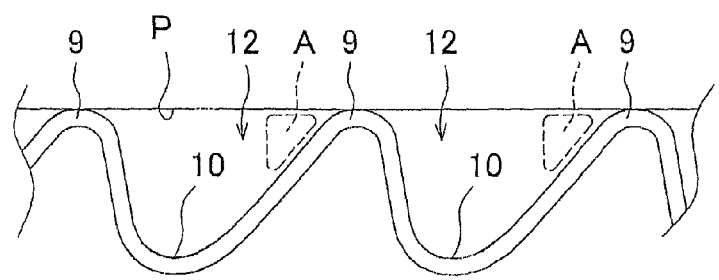
FIG. 3 is an enlarged cross sectional view of a portion of the plate.

On the top plate 2, a plate 7 that supports a cooking container P is arranged concentrically with the burner head 5 of the burner 4 viewed from above. As shown in FIG. 2, this plate 7 is ring-shaped where an opening 8 which is larger than the burner head 5 is defined at the center. Moreover, eight protrusions 9, 9 ... having an angular cross section where slopes become gentler as they extend toward the outer circumferential side that are spirally arranged around the opening 8 viewed from above. These protrusions 9 are all formed at the same height by press forming, and as shown in FIG. 3, the cross section of the protrusions 9 is asymmetrical where a slope on the side of the center of the plate 7 is gentle (on the left side in FIG. 3) and a slope on the outer circumferential side is steep (on the right side of FIG. 3). Moreover, between adjacent protrusions 9, 9, valleys 10, 10 ... having a steep slope on a center side wall and a gentle slope on an outer circumferential side wall are respectively defined. The reference number 11 denotes a guide cylinder disposed concentrically with the burner head 5 and the guide cylinder is slightly larger than the burner head 5. The guide cylinder 11 is shaped in a mortar whose diameter becomes larger as it approaches to the upper side, and an upper end thereof is proximate to the opening 8 of the plate 7.

In the burner portion 1 described above, when the cooking container P is put on the plate 7, the bottom surface of the cooking container P is supported by ridges of the protrusions 9 provided spirally at the same height. Accordingly, a spiral combustion gas route 12 into which external air hardly flows is formed on the plate 7 by an upper surface of the plate 7 and the bottom surface of the cooking container P.

In this state, when the burner 4 is burning, combustion gas is radially jetted from the flame port 6 of the burner head 5 to flow into each combustion gas route 12, and strikes the protrusions 9, and goes through between the plate 7 and the bottom surface of the cooking container. When combustion gas strikes the protrusions 9, it flows upward along a slope of the protrusions 9, and repeats striking the bottom surface of the cooking container P being guided spirally, and then is sent to the outside. In other words, in the combustion gas route 12 a smooth discharge of the combustion gas along the protrusions 9 is prevented, and the combustion gas is always subject to direction changing force and its flow is disturbed. Consequently, a transfer border film is unlikely to be formed on the bottom surface of the cooking container P, and the contact distance between the combustion gas and the bottom surface of the cooking container P is made long, so that the heat of the combustion gas is transmitted to the bottom surface of the cooking container P preferably.

In particular, the valleys 10 formed between the protrusions 9, 9 are asymmetrical. Thus, on the gentle slope side, the combustion gas, which is directed to the side of the outer circumference along the protrusions 9, flows along a gentle slope utilizing its stream, and is easily guided to the side of the bottom surface of the cooking container P, and accordingly, the combustion gas strikes the bottom surface of the cooking container P efficiently. In addition, since the flow rate of the combustion gas becomes faster at an upper portion of a gentle slope ("A" portion in FIG. 3), which is relatively narrow, than other portions, the combustion gas flow rate is not decreased along with the decrease of the volume flow rate of the combustion gas, so that hot combustion heat does not diffuse and is efficiently transmitted to the cooking container P. Additionally, because of the difference of the flow rate between the side of the gentle slope and the side of a steep slope, turbulence is likely to occur in the combustion gas route 12, so that heat exchange between the combustion gas and the bottom surface of the cooking container P is promoted more efficiently.

As described above, in the burner portion 1, a plurality of protrusions 9 having an angular cross section are arranged on the plate 7 spirally viewed from above. Thus, the combustion gas flowing along the protrusions 9 is guided to the side of the bottom surface of the cooking container P along an angular slope. As a result, the combustion gas strikes the bottom surface of the cooking container P efficiently. Consequently, the contact distance between the combustion gas and the bottom surface of the cooking container P increases. Thus, heat exchange between the combustion gas and the bottom surface of the cooking container P is conducted sufficiently.

In particular, in the present embodiment, the protrusions 9 are formed to be asymmetrically angular where a slope on the side of the center of the plate 7 is gentler than a slope on the outer side of the plate 7. Thus, the combustion gas is easily guided to the side of the bottom surface of the cooking container P by the gentle slope, and accordingly, the combustion gas strikes the bottom surface of the cooking container P efficiently. Moreover, the combustion gas flow rate is not decreased along with the decrease of the volume flow rate of the combustion gas. Thus, hot combustion heat does not diffuse and it is efficiently transmitted to the cooking container.

Moreover, since all the protrusions are formed at the same height so as to support the bottom surface of the cooking container, an efficient configuration is achieved in which the protrusions are also used for supporting the cooking container like conventional trivet claws.

Further, as the protrusions 9 are formed by press forming, so that the protrusions 9 are easily formed at a low cost.

Although in the present embodiment the protrusions on the plate are formed in an angular shape whose cross section is asymmetrical, forming in a symmetrically angular shape is acceptable. Further, valley portions are formed at the same depth through all the length of the protrusions from the inner circumferential side as an entrance of combustion gas to the outer circumferential side as an exit of combustion gas, however, the valley portions may be formed to be shallower as they extend toward the outer circumferential side. In this case, a route cross sectional area of the combustion gas route does not change regardless of the distance from the burner, or, the route cross sectional area is decreased when the distance becomes farther. Therefore, the decrease in the combustion gas flow rate along with the decrease of the volume flow rate of the combustion gas is prevented more efficiently.

In addition, the number of the protrusions and an inclined angle of the protrusions to the radial direction of the plate, etc. are not limited to the above embodiment and can be modified appropriately. For example, a linear protrusion having no angular portion can be arranged spirally. Further, utilizing all protrusions for supporting the cooking container is not necessary. That is, a part of protrusions may be extended for supporting the cooking container.

In addition, the present invention may be applied to not only a table burner, but also a built-in burner or a simple burner and the like.

What is claimed is:

1. A cooking stove comprising:
   a top plate of a body;
   a burner;
   a ring-shaped plate disposed on the top plate and around the burner; and
   a plurality of protrusions having an angular cross section disposed on the ring-shaped plate spirally viewed from above, each of said protrusions being formed by two sides that are asymmetrically angular with respect to one another, each side having a single slope over substantially the entire height of said protrusion, wherein the slope of the side toward a center of the ring-shaped plate is gentler than the slope of the side toward an outer side of the ring-shaped plate,
   wherein an entire apex of each protrusion lies on the same plane,
   wherein combustion gas of the burner passes between the ring-shaped plate and a bottom surface of a cooking container which is supported by the ring-shaped plate to heat the cooking container.

2. A cooking stove according to claim 1, wherein the protrusions are formed by press forming.

3. A cooking stove comprising:
   a top plate of a body;
   a burner;
   a ring-shaped plate disposed on the top plate and around the burner; and
   a plurality of protrusions having an angular cross section disposed on the ring-shaped plate spirally viewed from above, each of said protrusions being formed by two sides that are asymmetrically angular with respect to one another, each side having, a single slope over substantially the entire height of said protrusion, when viewed in a cross-section perpendicular to an extension direction of each said protrusion, wherein the slope of the side toward a center of the ring-shaped plate is gentler than the slope of the side toward an outer side of the ring-shaped plate, wherein the ring-shaped plate and a bottom surface of a cooking container which is supported by the ring-shaped plate define a path for combustion gas to pass therethrough to heat the cooking container.

4. A cooking stove according to claim 2, wherein the entirety of upper and lower extremities of said ring-shaped plate lie in planes that are parallel to one another.

5. A cooking stove according to claim 3, wherein the protrusions are formed by press forming.

6. A cooking stove according to claim 5, wherein the entirety of upper and lower extremities of said ring-shaped plate lie in planes that are parallel to one another.

* * * * *